United States Patent
Kita et al.

(10) Patent No.: US 6,642,468 B2
(45) Date of Patent: Nov. 4, 2003

(54) WIRE CUTTING ELECTRIC DISCHARGE MACHINE WITH COLLECTION OF MACHINED CHIPS

(75) Inventors: Yuki Kita, Yamanashi (JP); Yasuo Arakawa, Yamanashi (JP)

(73) Assignee: Fanuc Ltd., Yamanashi (JP)

( * ) Notice: Subject to any disclaimer, the term of this patent is extended or adjusted under 35 U.S.C. 154(b) by 28 days.

(21) Appl. No.: 10/091,316

(22) Filed: Mar. 6, 2002

(65) Prior Publication Data

US 2002/0125218 A1 Sep. 12, 2002

(30) Foreign Application Priority Data

Mar. 9, 2001 (JP) ........................................ 2001-066841

(51) Int. Cl.[7] ................................................ B23H 7/02
(52) U.S. Cl. .................................................... 219/69.12
(58) Field of Search ........................... 219/69.11, 69.12, 219/69.14

(56) References Cited

U.S. PATENT DOCUMENTS 5,767,473 A * 6/1998 Fujiwara .................. 219/69.14

FOREIGN PATENT DOCUMENTS

| JP | 62-4517 A | * | 1/1987 |
| JP | 3-287313 A | * | 12/1991 |
| JP | 4-57623 A | * | 2/1992 |
| JP | 9-216130 A | * | 8/1997 |

* cited by examiner

Primary Examiner—Geoffrey S. Evans
(74) Attorney, Agent, or Firm—Staas & Halsey LLP

(57) ABSTRACT

Vertically divided reticulated cage 20 is provided for receiving machined chips 2. A lower cage 21 is fitted into a lower guide 11 or a nozzle 14, and the lower cage 21 is detachably mounted thereto. An upper cage 22 is mounted to an upper guide 10 or a nozzle 13. During machining, the upper and lower cages 21 and 22 are brought into close contact with each other, and an electric discharge machining portion is surrounded by the cage 20. A work piece 1 and a clamp member 5 can move relatively with respect to the cage 22 and a wire electrode 12 by a notch 22a formed in the upper cage 22.

9 Claims, 8 Drawing Sheets

WIRE CUTTING ELECTRIC DISCHARGE MACHINE WITH COLLECTION OF MACHINED CHIPS

BACKGROUND OF THE INVENTION

1. Field of the Invention

The present invention relates to A wire electrical discharge machine. More particularly, the present invention relates to a wire electrical discharge machine capable of efficiently collecting machined chips which are machined products produced by electric discharge machining.

2. Description of the Prior Art

In a wire electrical discharge machine, voltage is Applied between a work piece and a wire electrode while relatively moving the wire electrode and the work piece, electricity is discharged therebetween, thereby machining the work piece. Machined chips which will become a product (machined product) obtained by this electric discharge machining and machined cuttings generated by electric discharge machining are drop into a wide machining tank, and the widely scattered machining chips and machining cuttings are manually collected after the machining.

As indicated in Japanese Utility Model Registration No. 2504638, there is proposed A method in which a product cut out from a work piece by electric discharge machining is collected by a main body of the wire electrical discharge machine or a transfer body such as an exterior robot.

However, it is extremely difficult to precisely position and collect machined chips which were cut out separately at arbitrary positions of the work piece. Especially if machined chips as products are small, it is almost impossible to collect all the chips.

There is a collecting method using magnetic or absorbing system, but there is a limit in shape, size, quantity and weight, and since precise positioning is required, such a collecting method is used only for a specific shape.

In a continuous machining using a wire electrical discharge machine, in order to cut out, products as many as possible from a limited sized expensive work piece, the most efficient machining method is to form a machining path in a form of one line as shown in FIG. 1A, and to sequentially cut out the machined products such that cutting margins or edges are not remained as much as possible.

FIGS. 1A to 1C show examples in which small chips 2 which will become machined products and which are triangular as viewed from above on a PCD (sintered diamond) disk 1 which is work piece are to be cut out by the wire electrical discharge machine. FIG. 1A is a plan view, FIG. 1B is a side view thereof and FIG. 1C shows the shape of the small chips obtained by the electrical discharge machine.

The machining path 4 of the wire electrode with respect to the work piece 1 is formed in a form of one line, and a plurality of machined chips 2 are cut out by this machining path 4. In FIG. 1A, a reference number 3 represents machined cutting which were not cut, and a reference number 5 represents a clamp member for grasping a disk 1 of the work piece.

In the case of such an electric discharge machining, small machined chips 2 and machined cuttings 3 which were cut out by jet stream of machining liquid during machining scatter into a machining tank. To collect the cut machined scatter into a machining tank. To collect the cut machined chips 2 and machined cuttings 3, there is conventionally no method except manually collecting after completion of all the machining operations, and it is difficult to collect them. Especially if machined chips which will be products and machined cuttings are small, they easily enter a narrow gap in a machining tank of a wire electrical discharge machine, and the chips and cuttings can not be collected, or they enter sliding surface of a mechanism in a machining tank, and there is a problem in that they may damage mechanical parts.

For example, when small machined chips 2 are cut out from a disk 1 of a CBN (Cubic Boron Nitride) sintered body or PCD (Polycrystalline Diamond) sintered body, since a unit price of the disk 1 of the work piece is expensive, a unit price of the machined chip 2 as a product becomes also expensive. If the expensive machined chips can not be collected, this is a serious problem.

Generally, PCD sintered body disk 1 has a diameter of about 60 to 70 mm and a thickness of about 1.6 to 3.2 mm. The machined chip 2 as a product in the cutting machining shown in FIG. 1A is rectangular in shape of about minimum 1 mm, usually about 2 mm ×4 mm, or triangular in shape of 3 mm in many cases. About 300 pieces of machined chip 2 can be cut and produced form one sheet of disk.

As shown in FIGS. 3A and 3B, the machined chips shown in this example are used as a blade on a tip end of a bite 6 of a lathe or used as a blade of an end mill or a reamer 7. Machined chips 2 cut out by the electric discharge machining have various shapes as shown in FIG. 2.

When machined chips 2 which are small machined products as described above are cut out by cutting machining, as shown in FIG. 4, some of the cut machined chips 2 and machined cuttings 3 drop into a machining tank 8, and other jump by jet stream of machining liquid and scatter onto a work table 9 or the like to which the clamp member 6 which grasps a work piece 1 is mounted. In FIG. 4, reference numbers 10 and 11 respectively represent an upper wire guide and a lower wire guide for guiding a wire electrode 12, and reference numbers 13 and 14 represent a nozzle for jetting machining liquid provided in the upper guide 10 and the lower guide 11 into a machining region.

Conventionally, machined chips 2 of the machined products are collected manually after completion of all machining operations. Even if one machine chip can be collected for 1 second, if there exists 300 pieces of machined chips, it takes five minutes, which remarkably reduces the operating efficiency. Further, operation for checking in a machining tank 8 thoroughly to confirm if there are any uncollected chips, which takes about 30 minutes or more, is required in the prior art. This confirming operation is a simple operation, which required patience and causes anguish. Further, in case where various shaped machined chips are machined as described above, whenever different shaped chips are machined, they must be collected, which takes time. If different shaped chips are mixed, it is necessary to distinguish the chips after collection, and this operation is tough.

As described above, when small machined products are machined by cutting machining, it takes time to collect the machined products, which remarkably reduces the operating efficiency of the wire electrical discharge machine.

OBJECTS AND SUMMARY OF THE INVENTION

The object of the present invention is to provide a wire electrical discharge machine which facilitates collection of machined products cut out by wire electric discharge machining.

To attain the above object, a wire electrical discharge machine of the present invention comprises receiving means for receiving machined chips to be cut out by electric discharge machining. The receiving means is disposed so as to cover a portion at least lower than a portion where electric discharge machining is carried out, or both the portion and a side, and the machined chips are prevented from passing through the receiving means, while machining liquid is allowed to pass through the receiving means.

Especially, a wire electrical discharge machine comprises an upper nozzle disposed above a work piece and a lower nozzle disposed below the work piece, in which a wire electrode is inserted between the upper nozzle and the lower nozzle, the wire electrode and the work piece are relatively moved with respect to each other to machine the work piece, thereby forming machined chips, wherein at least the lower nozzle or a lower guide to which the lower nozzle is mounted is provided with lower receiving means prevents the machined chips from passing therethrough and allows machining liquid to pass therethrough. This structure makes it easy to collect the machined chips.

Upper receiving means is mounted to an upper nozzle or an upper guide to which the upper nozzle is mounted so as to be opposed to the lower receiving means, combined receiving means configured by combining lower receiving means and the upper receiving means is formed at least during machining, and the machined chips are received by the combined receiving means. The work piece is to be grasped by a clamp member, the combined receiving means receives the work piece and the clamp member which grasps the work piece, and the combined receiving means has a gap for allowing the clamp member to come into and out of the combined receiving means. A resilient machined chip-stopping member is provided in the upper receiving means at the gap for preventing the machined chips from jumping out of the combined receiving means through the gap. The receiving means has a reticulated or porous structure such that machining liquid passes through the receiving means and the receiving means receives the machined chips. At least the lower receiving means receives the machined chips. At least the lower receiving means is detachably mounted to the lower nozzle or the lower guide to which the lower nozzle is mounted.

Further, in a wire electrical discharge machine in which a wire nozzle and wire guides are disposed laterally in a horizontal direction, and a wire electrode horizontally held by the wire guide and a vertically clamped work piece are moved relatively with respect to each other to machine the work piece, thereby generating machined chips is mounted to the wire nozzle or the wire guide, and the receiving means receives the machined chips. In this case, the receiving means is mounted to each of the left and right wire nozzles and wire guides, the left and right receiving means are abutted against with each other during machining, and when machined chips are taken out, the left and right receiving means are separated from each other.

BRIEF DESCRIPTION OF THE DRAWINGS

The above and further objects and features of the present invention will become apparent from the following description of embodiments with reference to the accompanying drawings, in which:

FIG. 1A is a plan view, FIG. 1B is a side view and FIG. 1C shows the shapes of the small chips obtained by the electrical discharge machine;

DETAILED DESCRIPTION OF THE PREFERRED EMBODIMENT

Figure 1A:
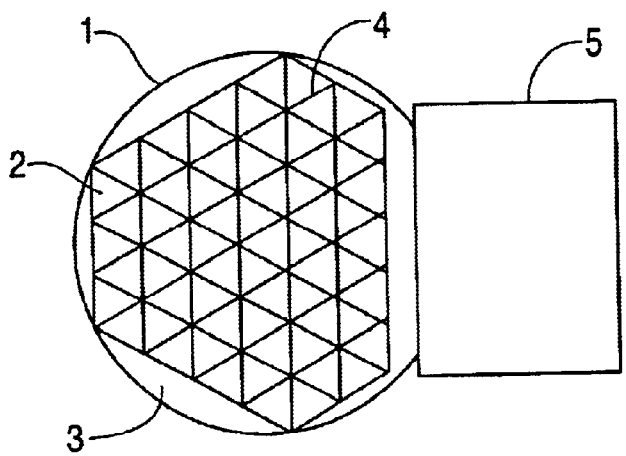
FIGS. 1A to 1C are explanatory views of cutting-out machining by wire electric discharge machining.
Figure 1B:
Figure 1C:
Figure 2:
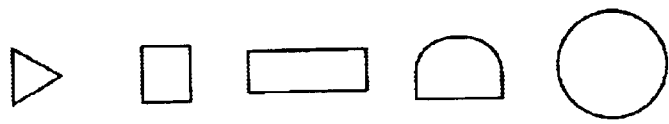
FIG. 2 shows an example of shapes of machined chips cut out by the cutting-out machining.
Figure 3A:
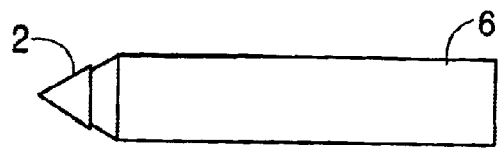
FIG. 3A and FIG. 3B show examples of use where a cut machined chip is used as a blade of a tool.
Figure 3B:
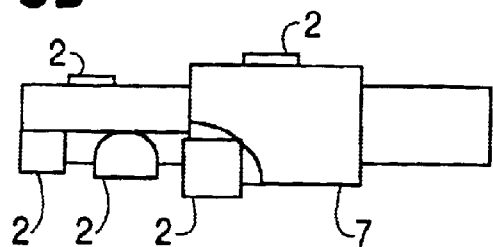
Figure 4:
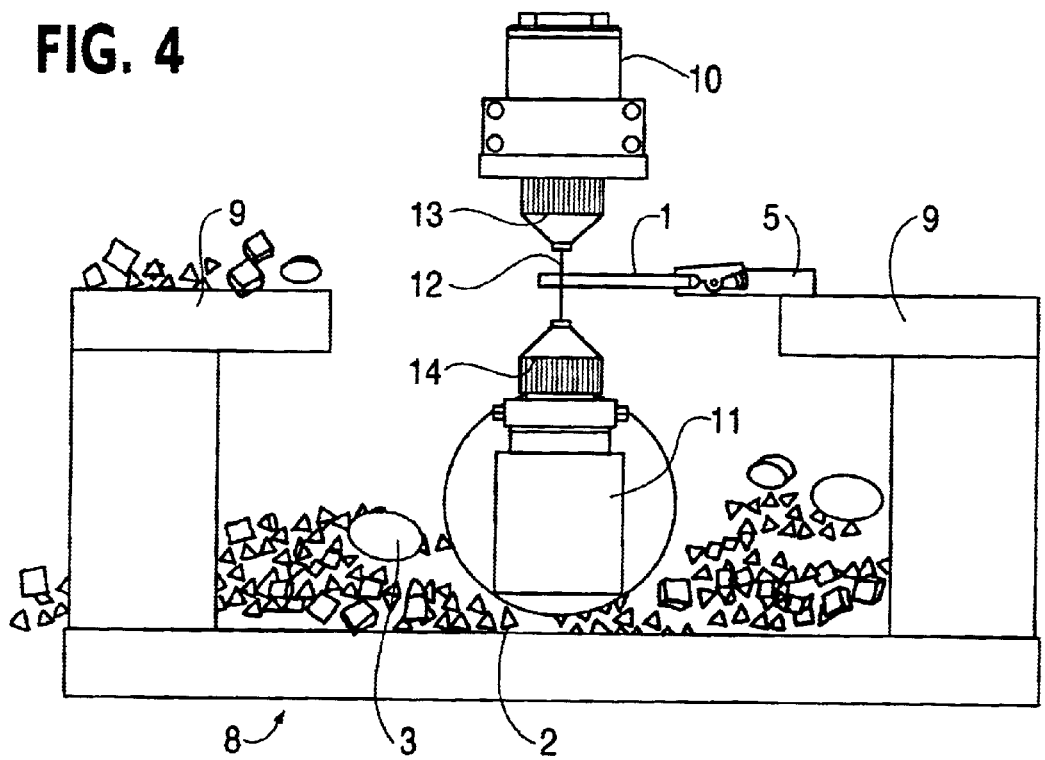
FIG. 4 shows a scattering state of machined chips caused by cutting-out operation by a conventional wire electrical discharge machine.
Figure 5:
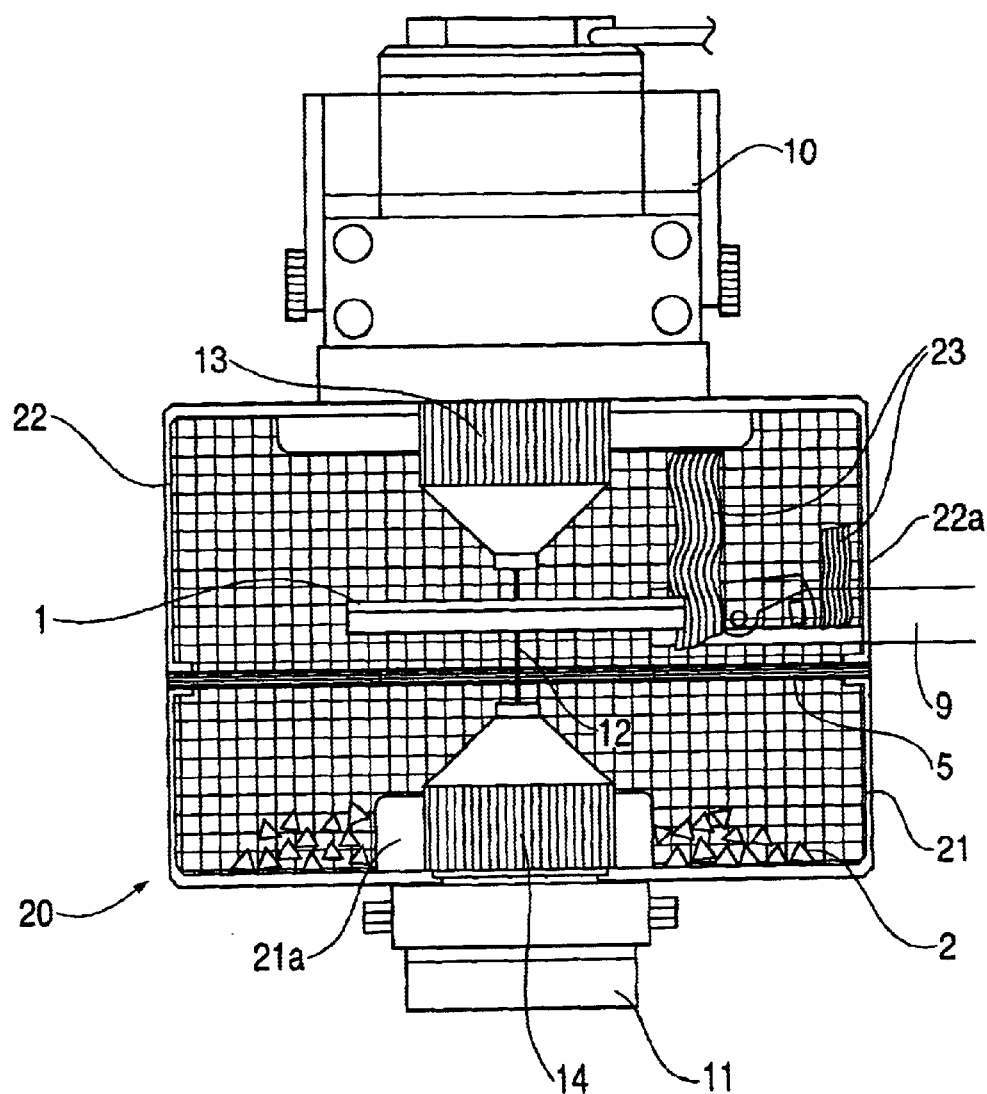
FIG. 5 is an explanatory view of an essential portion of an embodiment of the present invention.

FIG. 5 shows a structure of an essential portion of one embodiment of the present invention. This embodiment is different from the conventional wire electrical discharge machine in that a reticulated cage is provided as the receiving means which receives and collects machined chips (machined products) 2 obtained by wire electric discharge machining.

The cage 20 as the receiving means in this embodiment comprises a combination of a lower cage 21 constituting lower receiving means and an upper cage 22 constituting upper receiving means.

The lower cage 21 includes a mount portion 21a so that the lower cage 21 can be attachable to and detachable from a nozzle 14 of a lower guide 11 which guides a wire electrode 12. The upper cage 22 is mounted to an upper guide 10 (or the upper cage 22 may be detachably mounted to a nozzle 13 mounted to the upper guide 10). The upper cage 22 has a notch 22a through which a clamp member 5 which grasps the work piece 1 and which forms a gap which allows the work piece 1 to move for machining. The upper cage 22 also includes chip-stopping members 23 which prevent machined chips 2 and machined cuttings 3 from jumping out of the combined receiving means 20 through the notch 22a.

Resilient foam rubbers are mounted to an upper end peripheral surface of the lower cage 21 and a lower end peripheral surface of the upper cage 22.

Figure 6:
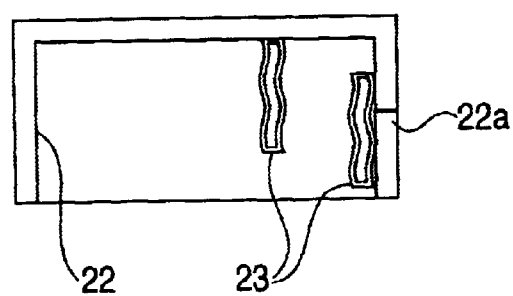
FIG. 6 is a sectional view of an upper cage of the embodiment.
Figure 7:
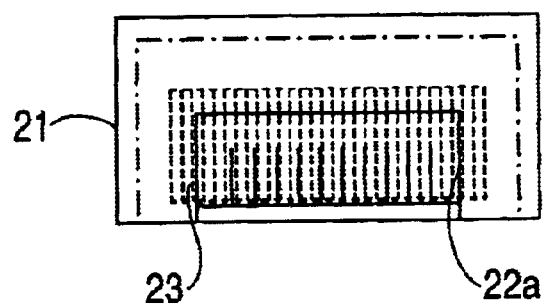
FIG. 7 is a side view of the upper cage of the embodiment.

FIG. 6 is a sectional view of the upper cage 22. FIG. 7 is a side view of the upper cage 22 as viewed from a right direction in FIG. 5. As shown in FIGS. 6 and 7, chip-stopping member 23 which prevents the machined chips 2 and machined cuttings 3 from jumping out is provided in the upper cage 22 in front of the notch 22a so as to seal the notch 22a. Another chip-stopping member 23 is provided between the notch 22a and the nozzle 13 of the upper guide 10. Each of the chip-stopping member 23 is made of resilient material, a lower end of the chip-stopping member 23 is free, and a slit is formed from an intermediate portion to a lower end of the chip-stopping member 23. With this configuration, the clamp member 5 which grasps the work piece 1 can move without being hindered by the chip-stopping member 23.

Figure 8:
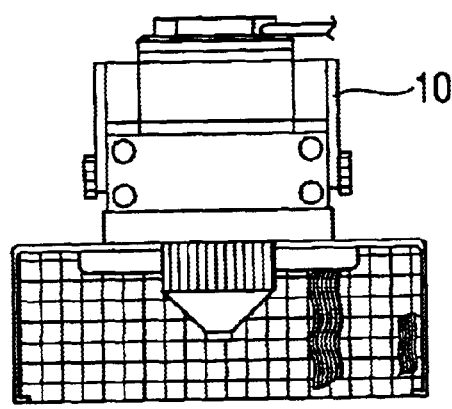
FIG. 8 is an explanatory view when an upper guide is caused to ascend for mounting a work piece and a lower cage in the embodiment.
Figure 8:
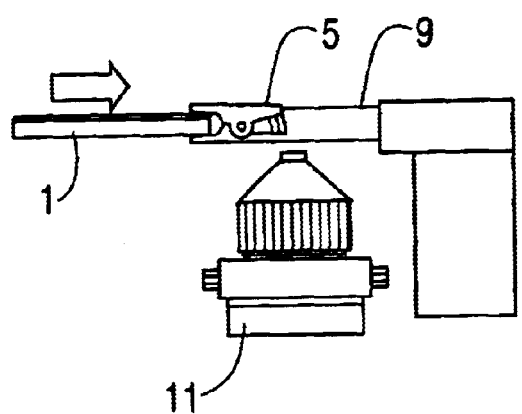
Figure 9:
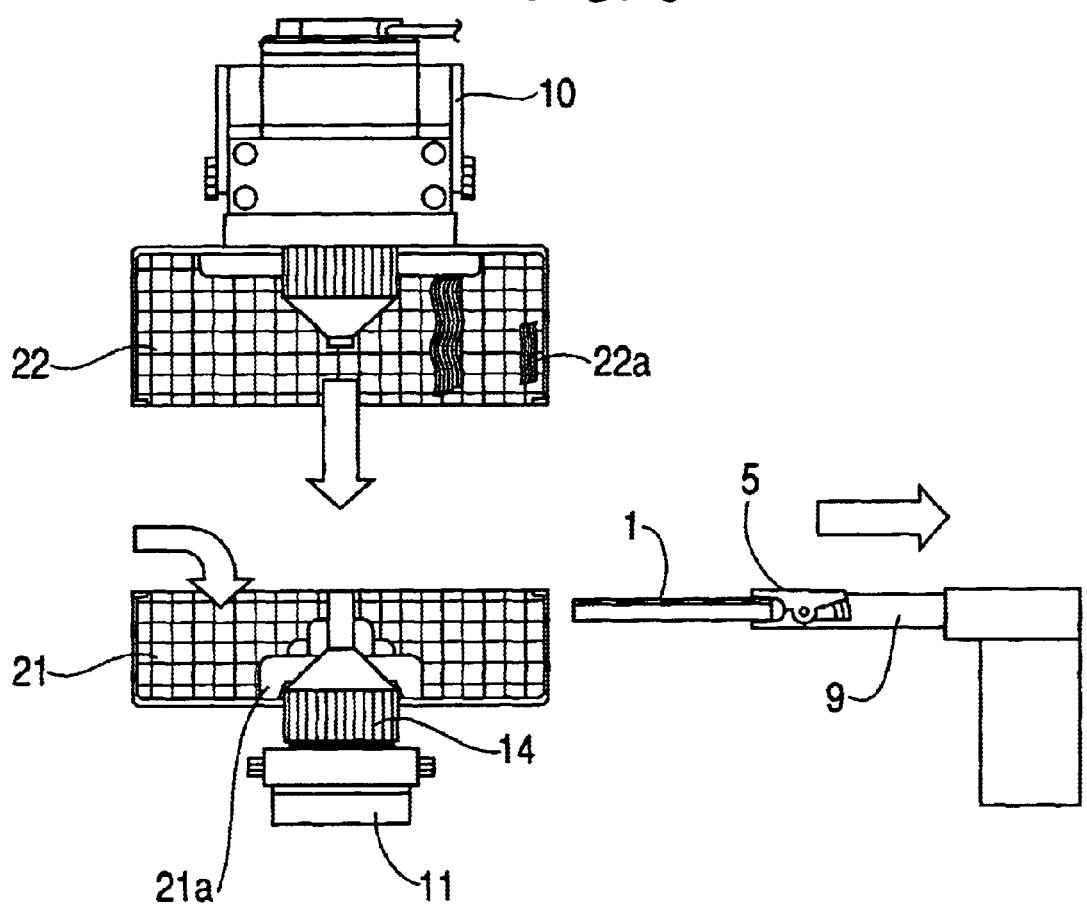
FIG. 9 is an explanatory view when a lower cage is mounted the embodiment.

First, as shown in FIG. 8, the upper guide 10 is caused to ascend, and the clamp member 5 is caused to grasp the work piece 1. Next, as shown in FIG. 9, the work table 9 is moved, the clamp member 5 and the work piece 1 are caused to retreat from the upper position of the lower guide 11, the nozzle 14 mounted to the lower guide 11 is inserted into a hole of the mount portion 21a of the lower cage 21, and the lower cage 21 is fixed to the lower guide 11.

Figure 10:
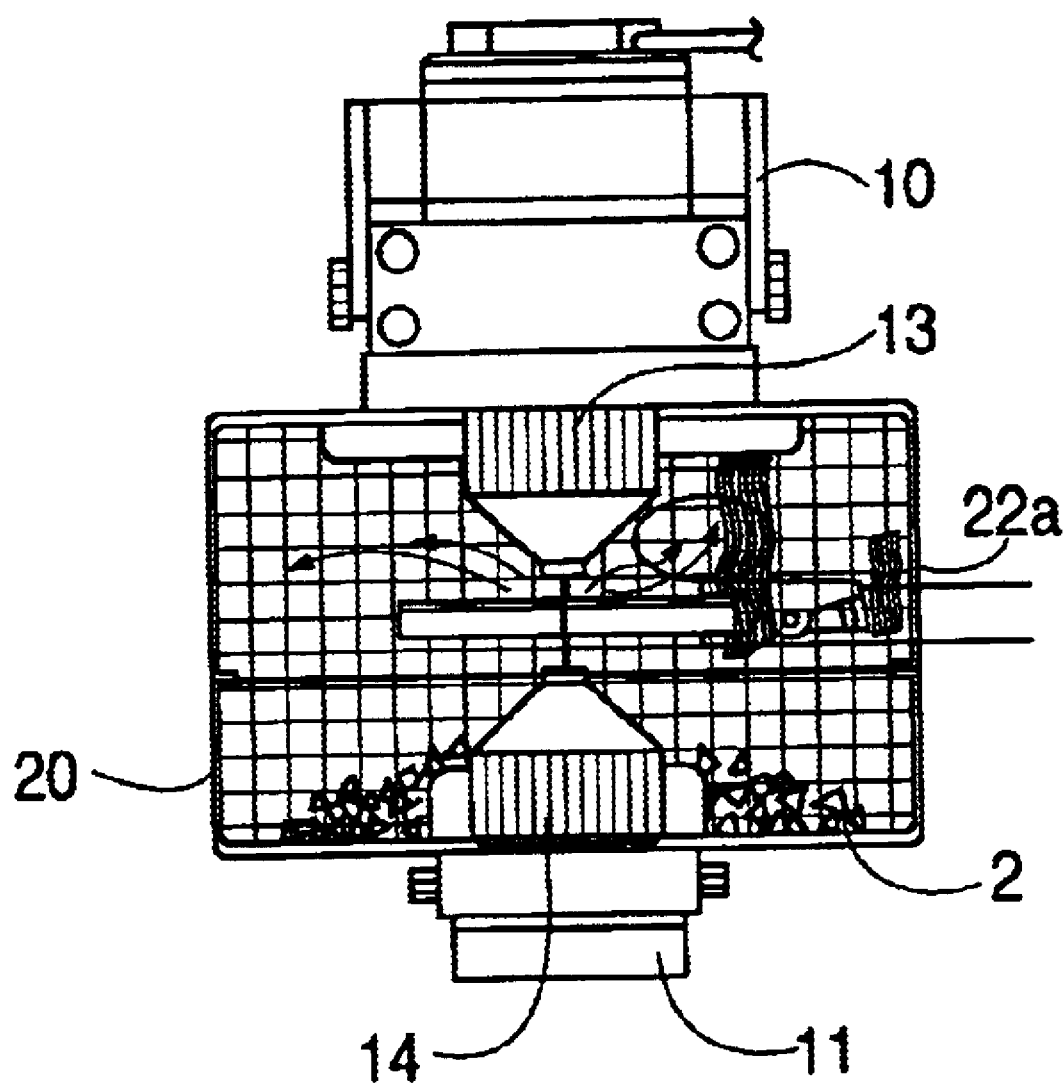
FIG. 10 is an explanatory view of a state when cutting-out machining is carried out by a wire electric discharge machining of the embodiment.

Next, the work table 9 is moved, the work piece 1 is moved to a wire connection position and then, the upper guide 10 is moved to a machining position so that a wire electrode 12 is connected. That is, the wire electrode 12 is allowed to pass through the upper guide 10 and lower guide 11 and is connected in the same manner as that of the prior art. At that time, the foam rubbers mounted to the lower end peripheral surface of the upper cage 22 and the upper end peripheral surface of the lower cage 21 are brought into tight contact with each other, and they abut against each other without generating a gap. The upper cage 22 and lower cage 21 form a space which is opened only at the notch 22a and closed at other portions. The work piece 1 grasped by the working clamp 5 is brought into a state shown in FIG. 10 surrounded by the cage 20 which forms the receiving means.

In this state, voltage is applied between the wire electrode 12 and the work piece 1, machining liquid is injected from the upper and lower nozzles 13 and 14, the work piece 1 is relatively moved with respect to the wire electrode 12 and in this state, electric discharge machining is carried out. The machining liquid injected from the upper and lower nozzles 13 and 14 is discharged from the reticulated shape of the cage, small machined chips 2 cut out by cutting operation or the like are accumulated and collected in the cage 20 which is the receiving means. At that time, when small machined chips 2 are cut out, even if the chips are blown by the jet stream of the machining liquid from the nozzle 14 of the lower guide 11, the upper cage 22 prevents the chips from moving, and the chips remain in the cage. Even if machined chips are blown away toward the notch 22a, the chips come into contact with the resilient chip-stopping member 23 mounted to the upper cage 22, and the chips are prevented from moving and drop into the cage 20 (see FIG. 10).

Figure 11:
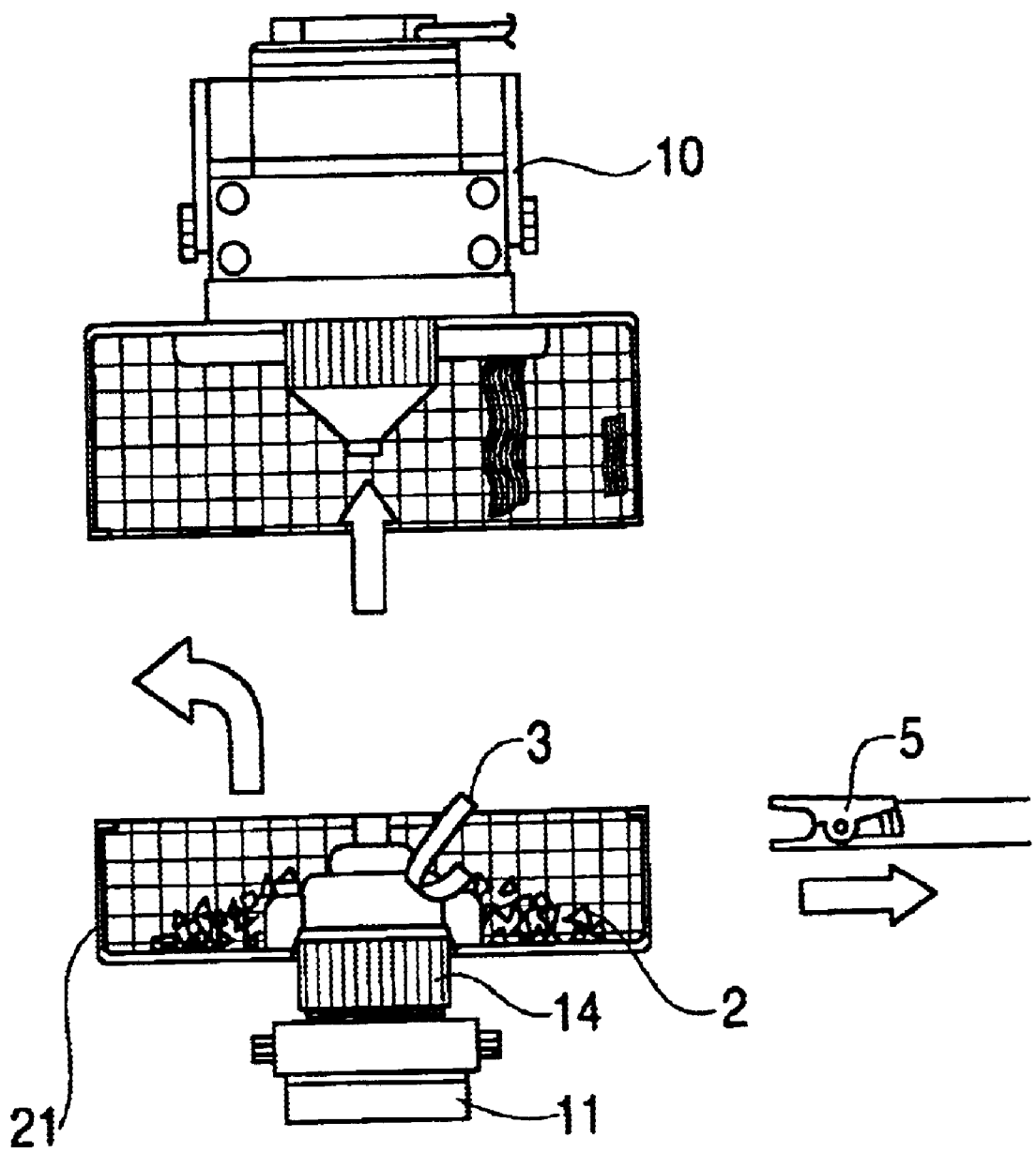
FIG. 11 is an explanatory view of a state in which the lower cage is collected after machining was completed in the embodiment.

If all the machining operations were completed in this manner, as shown in FIG. 11, the upper guide 10 is caused to ascend and the wire electrode 12 is cut off, the work table 9 is moved, the clamp member 5 is caused to retreat from the upper position of the lower guide 11, and the lower cage 21 which collects and holds the machined chips 2 obtained by the electric discharge machining are detached from the nozzle 14 of the lower guide 11 for collection. At that time, non machined portion 3' of the work piece 1 which has been grasped by the clamp member 5 is detached from the clamp member 6 and received in the lower cage 21 and collected at the same time.

The above description is for explanation of an electric discharge machining and collecting method of the machined product according to the present invention.

Figure 12:
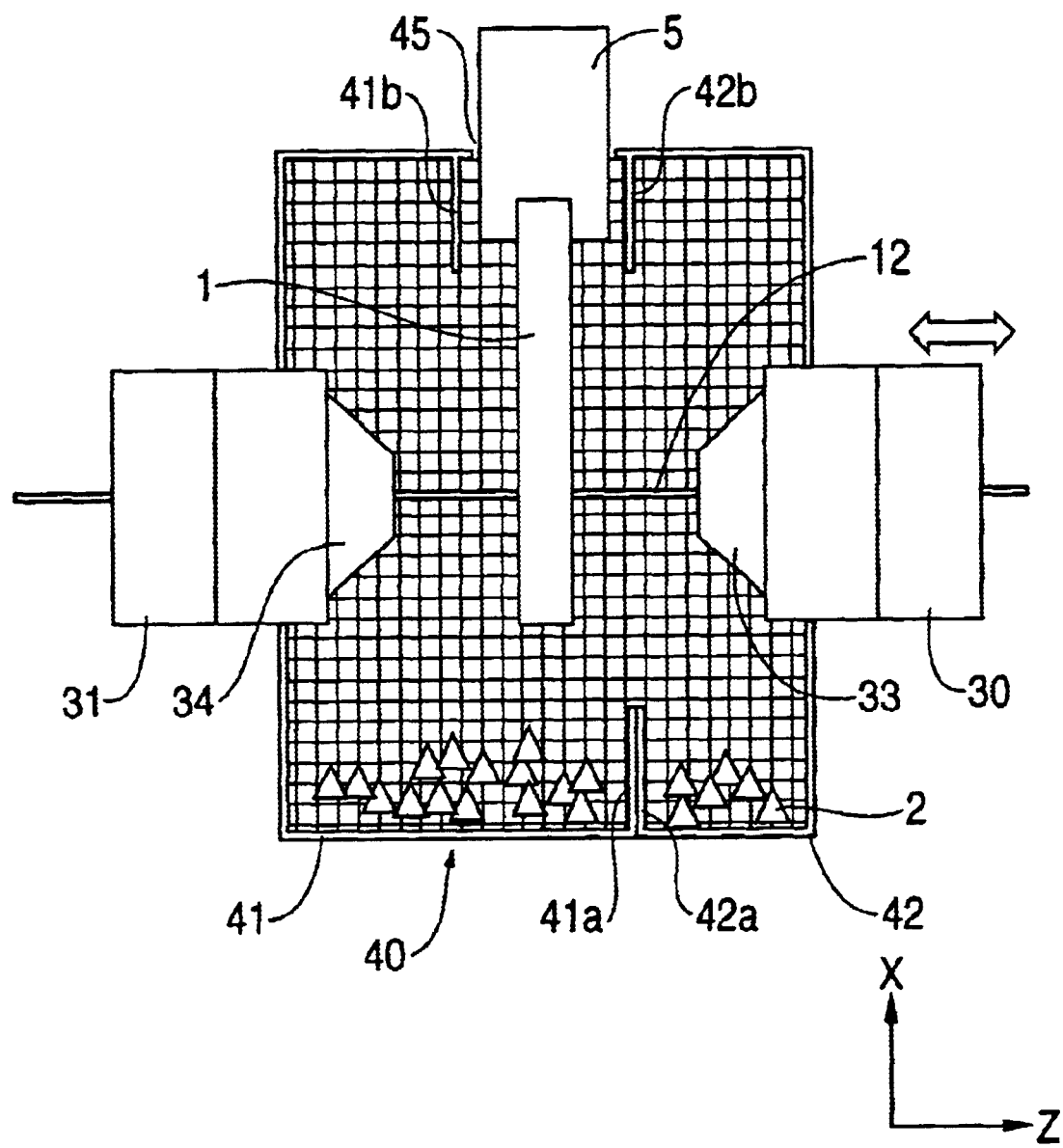
FIG. 12 is an explanatory view of an essential portion of a second embodiment of the present invention.

FIG. 12 shows an outline of a second embodiment of the present invention. The second embodiment is different from the first embodiment in that the wire electrode runs horizontally.

That is, a right guide 30 and a left guide 31 correspond to the upper guide 10 and the lower guide 11 of the first embodiment, respectively. The wire electrode 12 is guided by the right and left guides 30 and 31, and the wire electrode 12 runs from right to left in this embodiment. Reference numbers 33 and 34 represent nozzles provided on the right and left guides 30 and 31.

The work piece 1 is clamped in the vertical direction, and moves in a direction perpendicular to the tensile direction of the wire electrode 12. If the tensile direction of the wire electrode 12 is defined as a Z direction, the work piece 1 is allowed to move relatively with respect to the wire electrode in an X axis direction (up-and-down direction in the drawing paper of FIG. 12) which is perpendicular to the Z axis direction, and in a Y axis direction (direction of normal line of the paper sheet). A cage 40 constituting the combined receiving means which receives the machined products is also provided in this second embodiment. The cage 40 is divided into left and right cage portions. A left cage portion 41 constituting left receiving means is attachable and detachable to and from the left guide 31 or the nozzle 34, and a right cage portion 42 constituting right receiving means is attachable and detachable to and from the right guide 30 or the nozzle 33.

The clamp member 5 comes in and out of any one of or both of the left and right cage portions 41 and 42. Any one of or both of the left and right cage portions 41 and 42 are provided with notches 45 which form gaps through which the clamp member 5 moves for machining operation. In this second embodiment, the left cage portion 41 is provided with the notch 45. Open side peripheral surfaces of the left and right cage portions 41 and 42 abut air-tightly against each other except position thereof corresponding to the notch 45. Lower abutting surfaces of the left and right cage portions 41 and 42 are provided with dividing wall ribs 41a and 42a extending in the vertical direction. Ribs 41b and 42b extending in the vertical direction are provided as chip-stopping members in positions opposed to the notch 45.

First, the right guide 30 is caused to move in the Z axis direction to widen a gap between the left and right guides 30 and 31, and the left cage portion 41 is mounted to the left guide 31. The right cage portion 42 is mounted to the right guide 30. The clamp member 5 is caused to grasp a work piece 1, the work piece 1 is moved to an electric discharge machining-starting position, the right guide 30 is moved, the open side peripheral surfaces of the left and right cage portions 41 and 42 are brought into tight abutment against each other as shown in FIG. 12, and the work place 1 is covered with the cage 40.

If machining is carried out in the state shown in FIG. 12, the machining liquid injected from both the nozzle 33 and 34 flows out of the reticulated shape of the cage, and machined chips 2 are prevented from flowing out by the reticulated shape of the cage and then received in the cage 40. At that time, cut-out machined chips are captured by any one of the left and right cage portions 41 and 42. Since the injecting direction of machining liquid is the lateral direction, machined chips 2 are blown in the lateral direction by the jet stream or machining liquid, and are seldom blown in a vertical direction. Therefore, in the second embodiment, it is unnecessary to provide chip stopping member which closes the notch 45 provided in the case of the first embodiment. It is sufficient to prevent blown machined chips from dispersing by means of the ribs 41b and 42b provided around the notch 45, and the ribs 41b and 42b constitute the chip-stopping member.

After completion of electric discharge machining, the right guide 30 is moved rightward in FIG. 12, the wire electrode is cut, and then, the left and right cage portions 41 and 42 are detached from the guides 30 and 31, and the machined chips are collected. Even if the cage 40 is divided into the left and right cage portions 41 and 42, the machined chips in the left and right cage portions 41 and 42 do not fall out of the cage by the wall ribs 41a and 42a. In this case, also, non-machined portion of the work piece 1, which is grasped by the clamp member 5, is collected in the cage 40. Machined chips cut out in this manner are collected and then cleaned for use.

Although the cages 20 and 40 constituting the receiving means have reticulated structure in the above embodiments, the cages may be made of porous member instead of the reticulated structure. The upper portion of combined receiving means may be made of material other than the reticulated or porous material. That is, in the first embodiment, and upper cage 22 of the upper receiving means may not be of reticulated structure, and may simply be a cover which simply covers the upper portion and prevents machining liquid and machined chips and the like from jumping out thereof. In the second embodiment also, upper portions of the left and right cages may not be of the reticulated structure, and may be one mode of simple cover members through which machined chips and machining liquid can not pass. Further, to allow machining liquid to pass through the receiving means (lower receiving means), only the bottom surface of the receiving means may be made of reticulated or porous material, or of material which allows machining liquid to pass therethrough but does not allow machined chips to pass therethrough.

In the first embodiment, only the lower receiving means may be provided as receiving means. In this case, the side wall of the lower receiving means is formed high, and the lower portion and the side portion of a region where electric discharge machining is carried out with the wire electrode 12 and the work piece 1 are covered with this receiving means. In this case, it is necessary to form a gap in the side wall which allows the work piece 1 and the clamp member 5 to pass through and move for machining.

In each of the above embodiments, for detachably mounting cages, constituting the receiving means which are divided into tow pieces, to the guide or the nozzle, the cage is provided with mount portion, and the guide or the nozzle is fitted into and mounted to the hole of the mount portion. But, the cage may be mounted to the guide or the nozzle so that they are placed between two divided cage pieces. For example, in the first embodiment, the lower cage 21 is divided at a central line (a line passing through a center of the mount 21a), and, along the each of the divided sides, a wall rib extending in the vertical direction is provided. These wall ribs have apart which hold the guide or the nozzle between them and a part which comes into close contact with each other without generating a gap. By dividing a lower cage 21 and providing a rib at each divided side, machined chips can be held in the lower cage 21 even when the lower cage 21 are opened.

As explained above, in the present invention, it is possible to extremely easily and swiftly collect machined chips of machined product cut out by wire electric discharge machining. Especially when small machined chips such as cutting tools are to be obtained by wire electric discharge machining, collecting operation of the machined chips are remarkably facilitated as compared with the prior art. In recent years, since a machine tool is required to machine at high speed and efficiently, demand of the PCD and CBN tools in a machine tool is increase, and cutting-out working in wire electric discharge machining of blank machining is required to increase speed, efficiency and automation. The present invention meets such requirements, and it is possible to easily and swiftly collect machined chips after machining operation, and the efficiency of machining operation is enhanced.

For example, machining to cut out 300 pieces of machined chip continuously from a PCB sintered body disk had been carried out, and all of the machined chips and machined cuttings were collected in the lower cage of the lower receiving means. Conventionally, whenever machined chips were collected manually, it took about 30 minutes to check the machining tank thoroughly. When the present invention was used, the machining tank could be checked thoroughly for as short as five seconds, and the operating efficiency of the machine could be enhanced remarkably.

What is claimed is:

1. A wire electrical discharge machine in which voltage is applied between a stretched wire electrode and a work piece, machining liquid in injected between the wire electrode and the work piece, electricity is discharged between said wire electrode and said work piece while moving said wire electrode relative to said work piece, thereby machining said work piece to form machined chips, wherein receiving means for receiving said machined chips, which covers at least a portion lower than, or both lower than and a side of, the portion where electric discharge machining is carried out, is disposed, said receiving means preventing said machined chips from passing through and allowing to said machining liquid to pass through.

2. A wire electrical discharge machine comprising an upper nozzle disposed above a work piece and lower nozzle disposed below said work piece, in which a wire electrode is inserted between said upper nozzle and said lower nozzle, and said wire electrode moves relative to said work place to machine said work piece, thereby forming machined chips, wherein lower receiving means for receiving said machined chips are provided to at least said lower nozzle or a lower guide to which said lower nozzle is mounted said lower receiving means preventing said machined chips from passing through and allowing machining liquid to pass through.

3. The wire electrical discharge machine according to claim 2, wherein upper receiving means is mounted to an upper nozzle or an upper guide to which said upper nozzle is mounted so as to be opposed to said lower receiving means, combined receiving means configured by combining said lower receiving means and said upper receiving means is formed at least during machining, and said machined chips are received by said combined receiving means.

4. The wire electrical discharge machine according to claim 3, wherein said combined receiving means receives said work piece and a clamp member which grasps said work piece, and said combined receiving means has a gap for allowing said clamp member to come into and out of said combined receiving means.

5. The wire electrical discharge machine according to claim 4, wherein a resilient machined chip-stopping member is provided in an upper receiving means at said gap for preventing said machined chips from jumping out of the combined receiving means through said gap.

6. The wire electrical discharge machine according to claim 2, wherein said receiving means has a reticulated or porous structure such that machining liquid passes through said receiving means while said receiving means receives said machined chips.

7. The wire electrical discharge machine according to claim 2, wherein said lower receiving means is detachably mounted to said lower nozzle or said lower guide to which said lower nozzle is mounted.

8. A wire electrical discharge machine in which a wire nozzle and a wire guide are disposed laterally in a horizontal direction, a wire electrode horizontally held by said wire guide moves relative to a vertically clamped work piece to machine said work piece, thereby generating machined chips, wherein receiving means for receiving machined chips is mounted to said wire nozzle or said wire guide, said receiving means preventing said machined chips from passing therethrough and allowing machining liquid to pass therethrough.

9. The wire electrical discharge machine according to claim 8, wherein said receiving means is mounted to each of said left and right wire nozzle and wire guide, the left and right receiving means are abutted against with each other during machining, and when machined chips are taken out, the left and right receiving means are separated from each other.

* * * * *

UNITED STATES PATENT AND TRADEMARK OFFICE
CERTIFICATE OF CORRECTION

PATENT NO. : 6,642,468 B2
DATED : November 4, 2003
INVENTOR(S) : Yuki Kita et al.

It is certified that error appears in the above-identified patent and that said Letters Patent is hereby corrected as shown below:

Column 1,
Line 8, change "A" to -- a --.
Line 14, change "Applied" to -- applied --.
Line 26, change "A" (first occurrence) to -- a --.
Line 39, delete "," (second occurrence).
Lines 62-63, delete "To collect the cut machined scatter into a machinging tank."

Column 2,
Line 23, after "chips" insert -- 2 --.
Line 42, change "machine" to -- machined --.
Line 49, change "required" to -- requires --.

Column 3,
Line 16, after "means" insert -- for receiving the machined chips, and the lower receiving means --.
Lines 37-38, delete "At least the lower receiving means receives the machined chips ."
Line 47, after "chips" insert -- , receiving means for receiving machined chips --.

Column 5,
Line 57, change "6" to -- 5 --.

Column 6,
Line 47, change "place" to -- piece --.
Line 58, change "or" to -- of --.

Column 7,
Line 23, change "mode" to -- made --.
Line 42, change "tow" to -- two --.
Line 51, change "apart" to -- a part --.
Line 66, change "increase" to -- increased --.

UNITED STATES PATENT AND TRADEMARK OFFICE
CERTIFICATE OF CORRECTION

PATENT NO. : 6,642,468 B2
DATED : November 4, 2003
INVENTOR(S) : Yuki Kita et al.

It is certified that error appears in the above-identified patent and that said Letters Patent is hereby corrected as shown below:

Column 8,
Line 1, change "automation" to -- automization --.
Line 32, after "and" insert -- a --.
Line 35, change "place" to -- piece --.

Column 9,
Lines 9-10, delete the paragraph break .

Signed and Sealed this

Twenty-seventh Day of April, 2004

JON W. DUDAS
*Acting Director of the United States Patent and Trademark Office*